United States Patent [19]

Emerson et al.

[11] Patent Number: 5,553,059
[45] Date of Patent: Sep. 3, 1996

[54] NETWORK INTERFACE UNIT REMOTE TEST PATTERN GENERATION

[75] Inventors: Earl A. Emerson, Somerset; Henry J. Gonzalez, Piscataway; Kyung-Yeop Hong, Belle Mead, all of N.J.

[73] Assignee: Integrated Network Corporation, Bridgewater, N.J.

[21] Appl. No.: 440,297

[22] Filed: May 26, 1995

Related U.S. Application Data

[63] Continuation of Ser. No. 159,807, Nov. 30, 1993, abandoned, which is a continuation-in-part of Ser. No. 29,876, Mar. 11, 1993, Pat. No. 5,394,145.

[51] Int. Cl.$^6$ ..................................... H04J 3/14
[52] U.S. Cl. ................... 370/14; 370/15; 370/17; 379/5; 379/28; 379/29; 371/5.1; 371/20.5
[58] Field of Search ................. 370/13, 14, 15, 370/17; 379/1, 5, 22, 26, 27, 28, 29, 32; 371/5.1, 5.2, 20.1, 20.4, 20.5

[56] References Cited

U.S. PATENT DOCUMENTS

| | | | |
|---|---|---|---|
| 3,920,975 | 11/1975 | Bass | 235/153 AK |
| 4,090,035 | 5/1978 | Popkin | 370/15 |
| 4,271,513 | 6/1981 | Maejima et al. | 371/20.5 |
| 4,385,384 | 5/1983 | Rosbury et al. | 371/22 |

(List continued on next page.)

FOREIGN PATENT DOCUMENTS

| | | | |
|---|---|---|---|
| 0200842 | 11/1986 | European Pat. Off. | H04L 11/12 |
| 61-163761 | 7/1986 | Japan | H04L 27/00 |
| 1282935 | 11/1989 | Japan | H04J 3/14 |
| 05199246 | 8/1993 | Japan | H04L 12/42 |

OTHER PUBLICATIONS

Chernak, J. and Lang J. J., "D4 Digital Channel Bank Family: Overview", *The Bell System Technical Journal*, 61:9 2607–2845 (Nov. 1982).

Snow, N. E. and Knapp, J., Jr., "Digital Data System: System Overview", *The Bell System Technical Journal*, 54:5 (May–Jun., 1975).

Bell Communications Research, "Generic Requirements for the Subrate Multiplexer", *Technical Advisory, TA–TSY–000189*, Issue 1, (Apr. 1986).

Bell Communications Research, "Generic Requirements for the Digital Data System (DDS) Network Office Channel Unit", *Technical Advisory, TA–TSY–000083*, Issue 2, (Apr. 1986).

Bell Communications Research, "Digital Data System (DDS) Multipoint Junction Unit (MJU) Requirements", *Technical Advisory, TA–TSY–000192*, Issue 2, (Apr. 1986).

"Carrier–to–Customer Installation DS1 Metallic Interface", *American National Standard for Telecommunications*, (New York) ANSI T1.403–1989.

Bell Communications Research, "Digital Channel Banks— Requirements for Dataport Channel Unit Functions", *Technical Advisory, TA–TSY–000077*, Issue 3:18–19 (Apr. 1986).

Bell Communications Research, "Operations Technology Generic Requirements (OTGR): Network Maintenance: Access and Testing", *Technical Reference, TR–TSY–000476*, Section 6, Issue 3:80, 82–83, (Jun. 1990).

*Primary Examiner*—Douglas W. Olms
*Assistant Examiner*—Russell W. Blum
*Attorney, Agent, or Firm*—Hamilton, Brook, Smith & Reynolds, P.C.

[57] ABSTRACT

A system for isolating the direction of communication errors in the local loop of a digital data network is described. A Network Interface Unit (NIU) located at the customer premises typically has a loopback feature, allowing for Bit Error Rate Tests (BERT) to be performed on the local loop from a remote test system located on the data network. The NIU loopback test isolates transmission problems at the customer premises from problems on the local loop. The present invention adds test pattern generation capability to the NIU, allowing the remote test system to determine whether the transmission problem on the local loop is in the network to customer premises direction or in the customer premises to network direction.

30 Claims, 4 Drawing Sheets

U.S. PATENT DOCUMENTS
| | | | |
|---|---|---|---|
| 4,446,340 | 5/1984 | Fryer | 379/5 |
| 4,685,102 | 8/1987 | Lewis | 370/15 |
| 4,742,518 | 5/1988 | Shedd | 371/22 |
| 4,745,622 | 5/1988 | Gupta | 375/14 |
| 4,918,623 | 4/1990 | Lockitt et al. | 364/514 |
| 5,224,149 | 6/1993 | Garcia | 379/5 |
| 5,343,461 | 8/1994 | Barton et al. | 370/13 |

NETWORK INTERFACE UNIT REMOTE TEST PATTERN GENERATION

RELATED APPLICATIONS

This application is a continuation of application Ser. No. 08/159,807 filed Nov. 30, 1993, now abandoned, which is a Continuation-in-Part of Ser. No. 08/029,876, filed on Mar. 11, 1993, now U.S. Pat. No. 5,394,145.

BACKGROUND OF THE INVENTION

Digital data networks are widely deployed throughout the United States. In such networks, a plurality of end user stations communicate among themselves or with a host station using a digital communication link called a local loop. The local loop is comprised of a four wire metallic line in which information is transmitted in one direction over two wires and received in the other direction over the two remaining wires.

At the network service office, which is typically the local telephone company, one end of the local loop is terminated at a Channel Bank. The Channel Bank contains a plurality of Office Channel Unit Data Ports (OCU-DP). At the customer's premises, the other end of the local loop is terminated at a Channel Service Unit (CSU) or Data Service Unit (DSU).

Many digital data networks employ a Network Interface Unit (NIU) to terminate the local loop on or near the customer's premises. The NIU is an electronic device provided by the local telephone company to establish a well defined demarcation point between the customer premises and the local loop. The NIU is instrumental in distinguishing between transmission problems on the local loop and transmission problems at the customer's premises. Telephone companies issue loopback commands to the NIU which program the NIU to enter into loopback mode. While in loopback mode, any data received by the NIU is returned to the sender. This allows the telephone company to perform Bit Error Rate Tests (BERTs) using the NIU as a loopback point and to determine if transmission problems are isolated to the local loop or include the customer's premises.

Without the NIU, the telephone company is limited to loopback points at the customer's Channel Service Unit or Data Service Unit (CSU/DSU). With only CSU/DSU loopback points available, the telephone company is unable to differentiate between local loop failures and customer premises failures. Using an NIU, the telephone company is able to differentiate between data transmission failures at the customer's premises and failures due to the local loop, resulting in more efficient resolution of transmission problems.

SUMMARY OF THE INVENTION

When NIU loopback testing indicates that a transmission problem exists within the local loop, there is currently no method for further isolating the local loop failure to a particular direction of transmission: network terminal to customer premises or customer premises to network terminal. This invention includes an apparatus and method for obtaining further information about which particular direction of transmission is causing communication problems in the local loop. Specifically, a test pattern generation capability is added to the NIU which allows the telephone company to perform testing in the direction from customer premises to network terminal. The results of this test can then be used to deduce information about the other direction of transmission, namely, the network terminal to customer premises direction.

The present invention is directed to a system for isolating the direction of communication errors in the local loop of a digital data network. The system includes a test monitor which oversees the test operation, generates control commands including loopback test commands and remote pattern generation test commands, generates a stream of test data, examines test results and decides if a transmission error occurred and in which direction. The system also includes a communication unit at the phone company network terminal on one end of a local loop and an interface unit located on or near the customer premises on the opposite end of the local loop. The communication unit and the interface unit each have a transmitter and receiver for communicating in both directions on the local loop. The local loop provides a communication link in the direction of network terminal to customer premises and in the direction of customer premises to network terminal.

The interface unit at the customer premises includes a detector circuit for detecting various control commands transmitted from the test monitor through the communication unit at the network terminal and over the communication link, and a control circuit for reacting and responding to the control commands. When the detector circuit receives a loopback command, the control circuit responds by activating loopback mode in the interface unit. In loopback mode, the receiver of the interface unit is electrically coupled to the transmitter of the interface unit. All signals received from the communication unit at the network terminal are returned to the communication unit. When the detector circuit receives a generate pattern command, the control circuit responds by activating pattern generation mode in the interface unit. In pattern generation mode, the interface unit generates the test data sequence ordered by the test monitor and transmits the sequence to the communication unit at the network terminal.

The test monitor searches for errors in the test results. If an error is detected in the loopback test, then the test monitor deduces that the source of that error is either in the direction of network terminal to customer premises or in the direction of customer premises to network terminal. If an error is detected in the remote pattern generation test, then the test monitor deduces that the error is in the direction of customer premises to network terminal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
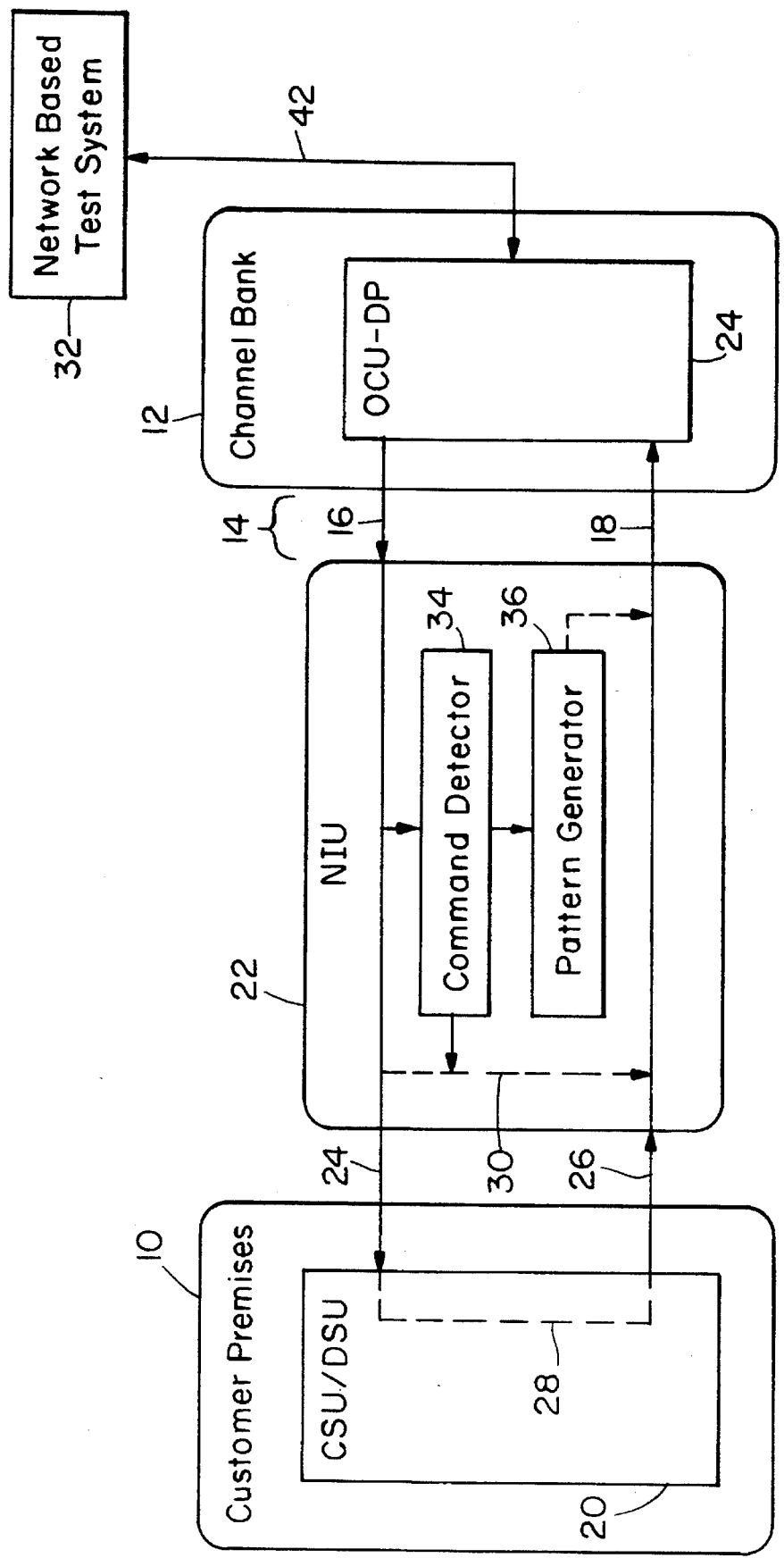
FIG. 1 is a block diagram of a digital data network employing a Network Interface Unit which is programmed to support a loopback test and a remote pattern generation test embodying the present invention.

FIG. 1 is a block diagram of a digital data network in accordance with the present invention. A Network Based Test System 32 provides control signals and test data signals 42 to a Channel Bank 12 which includes up to twenty four Office Channel Unit Data Ports (OCU-DP) 24. A local loop 14 provides a communication link between the Office Channel Unit Data Port (OCU-DP) 24 and the Customer Premises 10, which may include a Channel Service Unit and a Data Service Unit 20. The local loop comprises a four wire metallic line in which information is transmitted to the Customer Premises 10 over wire pair 16 and received from the Customer Premises 10 over the remaining wire pair 18.

Fundamental to network-based digital data services, maintenance equipment and test procedures ensure rapid location and repair of transmission problems. The Network Interface Unit (NIU) 22 is a recent addition to the maintenance equipment and is deployed to provide a well-defined demarcation point between the local loop 14 and the Customer Premises 10. Installed on or near the Customer Premises 10, the NIU 22 provides a test point so that any potential problems associated with equipment at the Customer Premises 10 are isolated from problems associated with the local loop 14. Without the NIU 22, the telephone company is unable to distinguish customer premises problems from local loop problems. With the NIU, the telephone company can rapidly identify problems and reduce the frequency of erroneous repair dispatches.

While in dormant mode, the NIU 22 simply provides a connection between the local loop 14 and the Customer Premises 10, in both transmit 16 and receive 18 directions. In this mode, command detector circuitry 34 within the NIU 22 continually monitors the transmission lines 16 for NIU mode command sequences, without affecting the signal quality of the information which is retransmitted over lines 24 to the Customer Premises 10. Data received from the Customer Premises 10 on lines 26 is passed on to the OCU-DP 24 on local loop lines 18.

While the NIU is in dormant mode, the Network Based Test System 32 may perform a loopback test on the network, with the Customer Premises 10 as the loopback termination point. The Channel Service Unit (CSU) or Data Service Unit (DSU) 20 located at the Customer Premises 10 is programmed to enter into loopback mode, represented by dashed line 28. The Network Based Test System 32 then transmits a serial stream of data in a predetermined pattern to a predetermined test loopback point 28 at the Customer Premises 10. The serial stream of data may be in the form of a conventional Bit Error Rate Test (BERT). From the loopback point 28, the data is returned back to the Network Based Test System 32 in the order that it was received.

If the BERT test with the CSU/DSU 20 as the loopback point results in an error, the telephone company can attempt to resolve the problem, but at this point, transmission problems on the local loop 14 are indistinguishable from transmission problems at the Customer Premises 10. By performing a BERT test with the NIU 22 as the test loopback point, transmission problems on the local loop 14 can be isolated from transmission problems at the Customer Premises 10.

In dormant mode, command detector circuitry 34 within the NIU 22 continually monitors information received on lines 16 for NIU mode commands. Control circuitry within the NIU 22 responds to detected commands by placing the NIU 22 in a proper mode. Upon receiving a NIU loopback test command, the NIU enters loopback mode, represented by dashed line 30.

The NIU loopback command sequence may comprise the conventional latching loopback sequence defined in:

"Digital Channel Banks-requirements for Data Port Channel Unit Functions," Issue 3, TA-TSY-000077, Bell Communications Research, Inc., April 1986, pg 18–19.

This command sequence, which is generated by the Network Based Test System 32 comprises:

1) A series of B Transition in Progress bytes
2) A series of C Loopback Select Code bytes
3) A series of D Loopback Enable bytes
4) A series of F Far End Voice bytes Preferably, B and C are greater than 35 and less than 40, D is greater than 100 and less than 120, and F is greater than 32 and less than 40. Preferably, a Transition in Progress byte is an 8 bit byte having the sequence S0111010, a Loopback Select Code byte is an 8 bit byte having the sequence SDDDDDD1 where DDDDDD is a device identifier code, a Loopback Enable byte is an 8 bit byte having the sequence S1010110, and a Far End Voice byte is an 8 bit byte having the sequence S1011010 where S equals 0 or 1 for all bytes. Note that the NIU 22 will enter loopback mode even when a small percentage of the command bytes are received in error.

After the NIU 22 enters loopback mode, the Network Based Test System 32 can initiate a BERT test with the NIU 22 as the termination point to determine the integrity of the local loop 14. In an NIU loopback test, a serial stream of bits is transmitted from the Network Based Test System 32 through the communication link 42 through the OCU-DP 24 to the NIU 22 over local loop 14 transmit lines 16. Each bit received by the NIU 22 is returned via loopback connection 30 which is switched into the circuit by the NIU control circuit, back to the OCU-DP 24 over transmit lines 18 and back to the Network Based Test System 32. The Network Based Test System 32 then compares the bit sequence received back from the NIU 22 with the sequence transmitted to the NIU 22.

If transmission problems are detected in the CSU/DSU 20 loopback test, and no transmission problems are detected in the NIU 22 loopback test, then the problem is at the Customer Premises 10 and not on the local loop 14. If transmission problems are detected in the NIU 22 loopback test, then a transmission problem exists in the local loop 14.

At this point, the prior art system does not have sufficient information to determine which direction of transmission is experiencing a problem. Since the NIU loopback test involves both the transmit 16 and receive 18 paths, a problem in either or both directions will produce NIU loopback test errors. A further resolution of the transmission performance of each respective direction is therefore needed.

To obtain a directional diagnosis of local loop transmission problems, the present invention includes an NIU 22 which provides a test pattern generation mode. In this mode, the NIU 22 is capable of generating a series of pseudo-random data sequences. The NIU 22 enters pattern generation mode upon receipt of a remote pattern generation command sequence sent by the Network Based Test System 32.

When the NIU 22 command detector circuit 34 detects a remote pattern generation command sequence on local loop lines 16, the pattern generator circuit 36 is activated. The command contains information about which test pattern is to be generated by the NIU 22. The requested test pattern is generated by the NIU and is transmitted over lines 18 to the OCU-DP 24 at the Channel Bank 12 where it is passed on to the Network Based Test System 32. The Network Based Test System 32 analyzes the test results and determines if a transmission error occurred.

If transmission errors occurred in the NIU loopback test and transmission errors occurred in the NIU pattern generation test, then it follows that the transmission problem is located in the receive direction of the local loop 14 on lines 18. If transmission errors occurred in the NIU loopback test, and no error occurred in the NIU pattern generation test, then it follows that the transmission problem is located in the transmit direction of the local loop 14 on lines 16.

It is preferred that the NIU generate test patterns which are standard in the industry because most modern Network Based Test Systems support a standard set of test patterns. These patterns, and many others, are defined in:

"Operations Technology Generic Requirements (OTGR): Network Maintenance Access and Testing", OTGR Section 6, TR-TSY-00476, Issue 3, Bell Communications Research, Inc., June 1990, pg. 83.

These patterns include:

1) A first stress pattern comprising a repetitive sequence of K bytes of a first series of identical bits and L bytes of a second series of bits of value opposite the first series.

2) A second stress pattern comprising a repetitive sequence of M bytes of zero and one bits in a predetermined sequence P and N bytes of identical bits R.

3) A third sequence comprising a repetitive sequence of bytes of zero and one bits in a predetermined sequence S.

4) A fourth stress pattern comprising the pseudo-random sequence known as the 2047 sequence.

Note that other sequences could be generated by the NIU without departing from the scope of the invention. Preferred values for the above stress patterns are: K equals 100, L equals 100, M equals 100, N equals 100, P is an 8 bit byte having the sequence 01111110, R is an 8 bit byte having the sequence 00000000, S is an 8 bit byte having the sequence 00110010 or 01000000. The 2047 sequence is a pseudo-random test data pattern derived via an 11 stage shift register with feedback through an exclusive-OR gate from the outputs of the ninth and eleventh stages as defined in TR-TSY-00476, page 80, cited above.

The remote pattern generation command sequence sent by the Network Based Test System 32 to trigger pattern generation mode in the NIU may comprise the well-known command sequence defined in Bellcore TA-TSY-000077 cited above. The sequence, called the latching loopback sequence, is used to initiate loopback mode in a selected unit. The remote pattern generation command sequence is the same sequence defined above to trigger loopback mode in the NIU with one exception. A step is added between the third (Loopback Enable bytes) and fourth (Far End Voice bytes) comprising iterations of a series of bytes with identical bits, preferably set to one. In conventional systems, this step is optional and is used to select an individual unit out of a series of tandem units along the communication link.

Since NIU's are not used in tandem configurations, the invention uses this optional step for a different purpose, specifically, to select which pattern the NIU is to generate. The command detector circuit 34 on the NIU 22 determines which pattern is to be generated based on the number of iterations of a series of Pattern Identifier bytes received between the Loopback Enable bytes and the Far End Voice bytes, and then orders the pattern generator 36 to commence. The remote pattern generation command sequence comprises:

1) A series of B Transition in Progress bytes
2) A series of C Loopback Select Code bytes
3) A series of D Loopback Enable bytes
4) Iterations of E series of Pattern Identifier bytes and G series of Loopback Enable bytes
5) A series of F Far End Voice bytes Preferably, B, C and E are greater than 35 and less than 40, D and G are greater than 100 and less than 120, and F is greater than 32 and less than 40. Preferably, a Transition in Progress byte is an 8 bit byte having the sequence S0111010, a Loopback Select Code byte is an 8 bit byte having the sequence SDDDDDD1 where DDDDDD is a device identifier code, a Loopback Enable byte is an 8 bit byte having the sequence S1010110, a Pattern Identifier byte is an 8 bit byte having the sequence S1111111, and a Far End Voice byte is an 8 bit byte having the sequence S1011010, where S equals 0 or 1 for all bytes. Note that the NIU will enter pattern generation mode even when a small percentage of the command bytes are received in error.

The Network Based Test System 32 may terminate the remote pattern generation test by transmitting a series of H Transition in Progress bytes. Preferably, a Transition in Progress byte is an 8 bit byte having the sequence S0111010 (S=0 or 1) and H is greater than 35.

Figure 2:
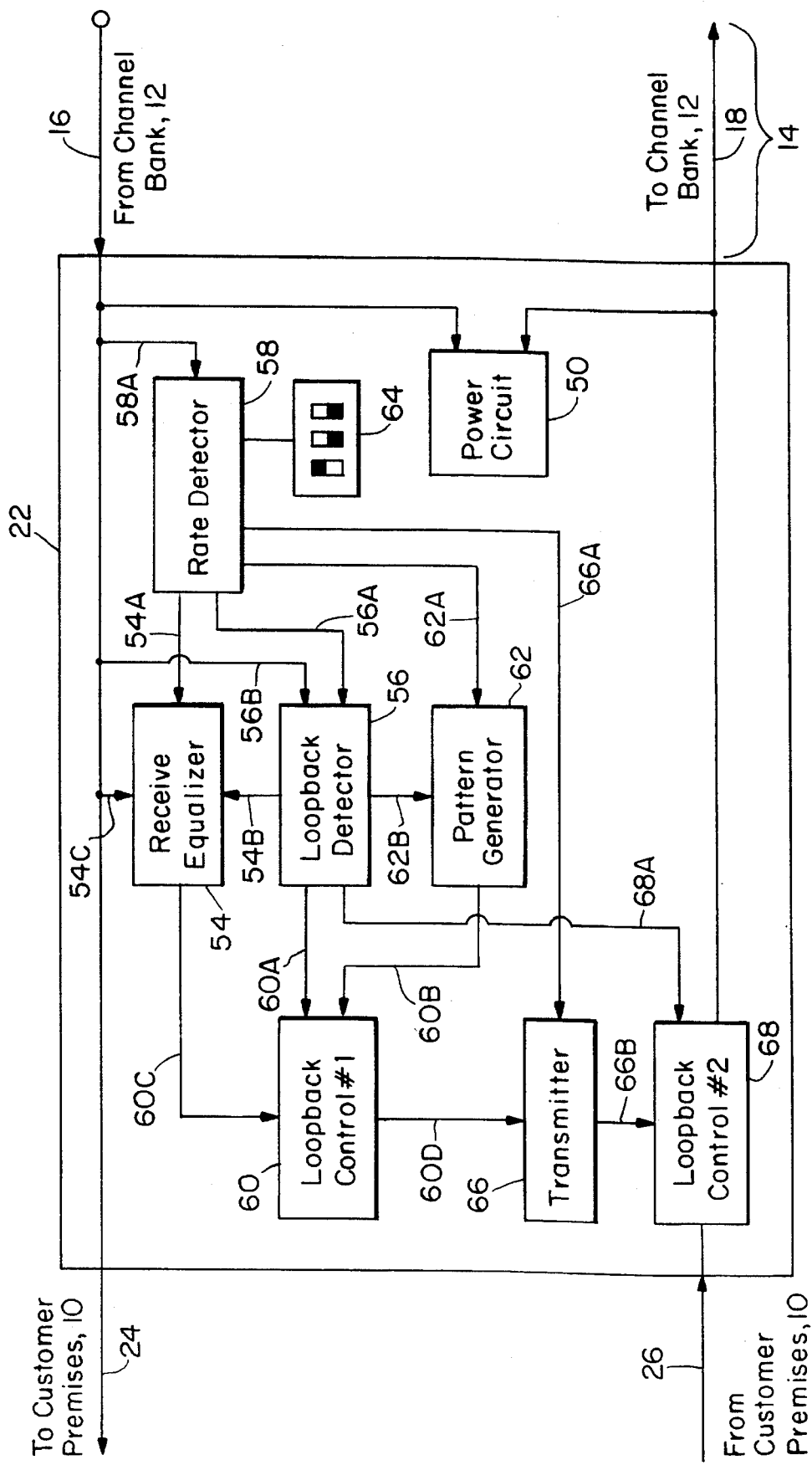
FIG. 2 is a detailed block diagram depicting the major components of a Network Interface Unit programmed to support a loopback test and remote pattern generation test embodying the present invention.

A block diagram of the NIU 22 is shown in FIG. 2. This is a modified version of the NIU device described in co-pending U.S. patent application 08/029,876 filed Mar. 11, 1993, incorporated herein by reference. The NIU 22 includes a power circuit 50, a rate detector circuit 58, a receive equalizer circuit 54, a loopback detector circuit 56, a first loopback control circuit 60, a second loopback control circuit 68, a transmitter 66, and a pattern generator circuit 62. The circuits may be implemented using discrete logic, a Field Programmable Gate Array, or a custom ASIC.

The power circuit 50 is used in an NIU that derives its power from the OCU-DP, the OCU-DP being located at the opposite end of the local loop 14. The power circuit 50 supplies power to all NIU 22 circuitry. Where the power circuit is not used, an external power supply is needed.

The rate detector circuit 58 determines the operating rate of the network, either automatically, through the use of an auto-rate detection circuit which is capable of sensing the transfer rate on local loop lines 16 at connection 58A, or manually through user controlled switches 64 mounted on the NIU. The rate detector circuit 58 also contains option logic which controls NIU configurations such as receive equalization, as will be discussed below. The rate detector circuit 58 sends configuration and rate information to the receive equalizer 54 by signal 54A, to the loopback detector 56 by signal 56A, to the pattern generator 62 by signal 62A, and to the transmitter 66 by signal 66A.

The loopback detector circuit 56 continually monitors local loop lines 16 for NIU command sequences. It is coupled to lines 16 by connection 56B. Upon receipt of a NIU loopback command sequence, discussed above, the loopback detector circuit 56 sends an activating signal to the first loopback control circuit 60 on connection 60A, and also sends a signal 54B to activate the receive equalizer circuit 54. Upon receipt of a remote pattern generation command, discussed above, the loopback detector circuit 56 transmits a signal 62B to the pattern generator circuit 62. The signal 62B activates the pattern generator circuit 62 and instructs the pattern generator circuit 62 on which pattern to generate. In either case, if the NIU is in loopback or pattern generation mode, the loopback detector circuit 56 transmits a signal 68A to the second loopback control circuit 68, which activates NIU transmission over lines 18.

The receive equalizer circuit 54 is described in U.S. Pat. No. 4,745,622 incorporated herein by reference. The equalizer, when activated, boosts and cleans data signals passing over the local loop. When the NIU 22 is in loopback mode, a signal 54B from the loopback detector circuit 56 activates the receive equalizer circuit 54. The receive equalizer 54 receives data from lines 16 at connection 54C, and transmits the processed data to the first loopback control circuit 60 over connection 60C. The receive equalizer 54 may also be activated by the manual switches 64. The receive equalizer 54 may be configured to be active when the NIU is in dormant mode, in which case the equalizer 54 receives signals from the local loop lines 16, processes them, and transmits the received signals on lines 24.

The first loopback control circuit 60 selects which data signal, either 60C from the receive equalizer 54 or 60B from the pattern generator 62, is sent to the transmitter 66. When the NIU 22 is in loopback mode, line 60C from the receive equalizer 54 is electrically coupled to the transmitter 66, providing a loopback path between lines 16 and lines 18. When the NIU is in pattern generation mode, line 60B from the pattern generator circuit 62 is electrically coupled to the transmitter input line 60D. The mode information is provided by line 60A from the loopback detector circuit.

Figure 3:
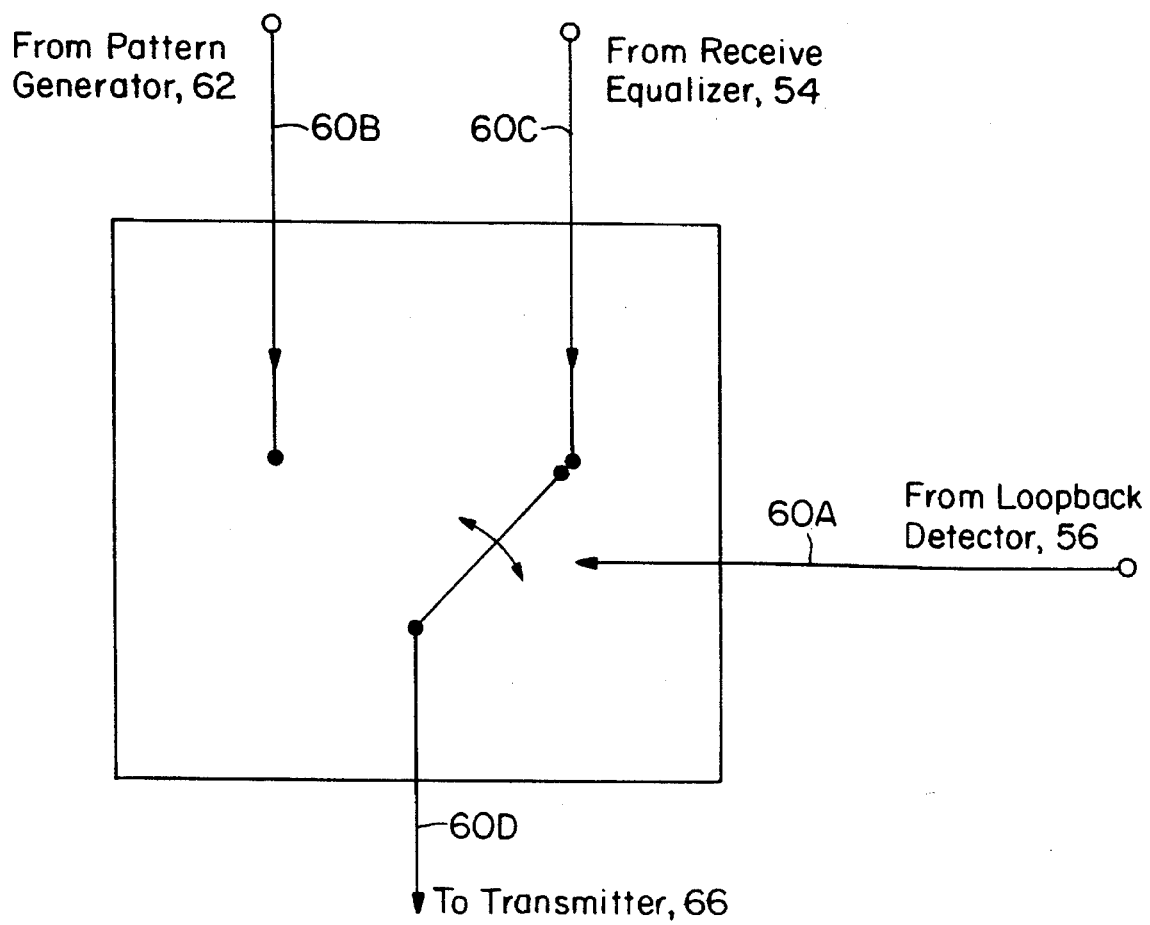
FIG. 3 is a schematic of the Network Interface Unit first and second loopback control circuits.

A more detailed schematic of the loopback control circuit is shown in FIG. 3. One of two input sources, line 60B from the pattern generator 62 or line 60C from the receive equalizer 54 is electrically coupled to the transmitter input line 60D. Control line 60A from the loopback detector circuit 56 determines which lines are to be coupled.

The transmitter 66 controls the frequency and voltage levels for signals transmitted from the NIU over lines 18 when the NIU is in pattern generation mode or in loopback mode. Rate information is received from the rate detector 58 over line 66A. Signals received on line 60D are retransmitted over line 66B to the second loopback control circuit 68.

The second loopback control circuit 68 is similar in function and design to the first loopback control circuit 60. The second loopback control circuit 68 selects which signal, either signal 26 from the customer premises or signal 66B from the NIU transmitter 66, is to be sent over lines 18. When the NIU 22 is active, either in loopback mode or in pattern generation mode, a signal 68A is sent from the loopback detector circuit 56 to activate the path from the NIU transmitter output 66B to local loop lines 18. When the NIU is dormant, the second loopback control circuit 68 electrically couples the customer premises return lines 26 and the local loop lines 18.

When the NIU is in remote pattern generation mode, the pattern generator circuit 62 transmits data sequences through the first loopback control circuit 60, through the transmitter 66, through the second loopback control circuit 68 and onto lines 18. The pattern generator circuit 62 is activated and deactivated by a control signal 62B received from the loopback detector circuit 56. The control signal 62B also instructs the pattern generator 62 on which sequence to generate. The pattern generator 62 is capable of generating several well known industry standard stress patterns as discussed above.

Figure 4:
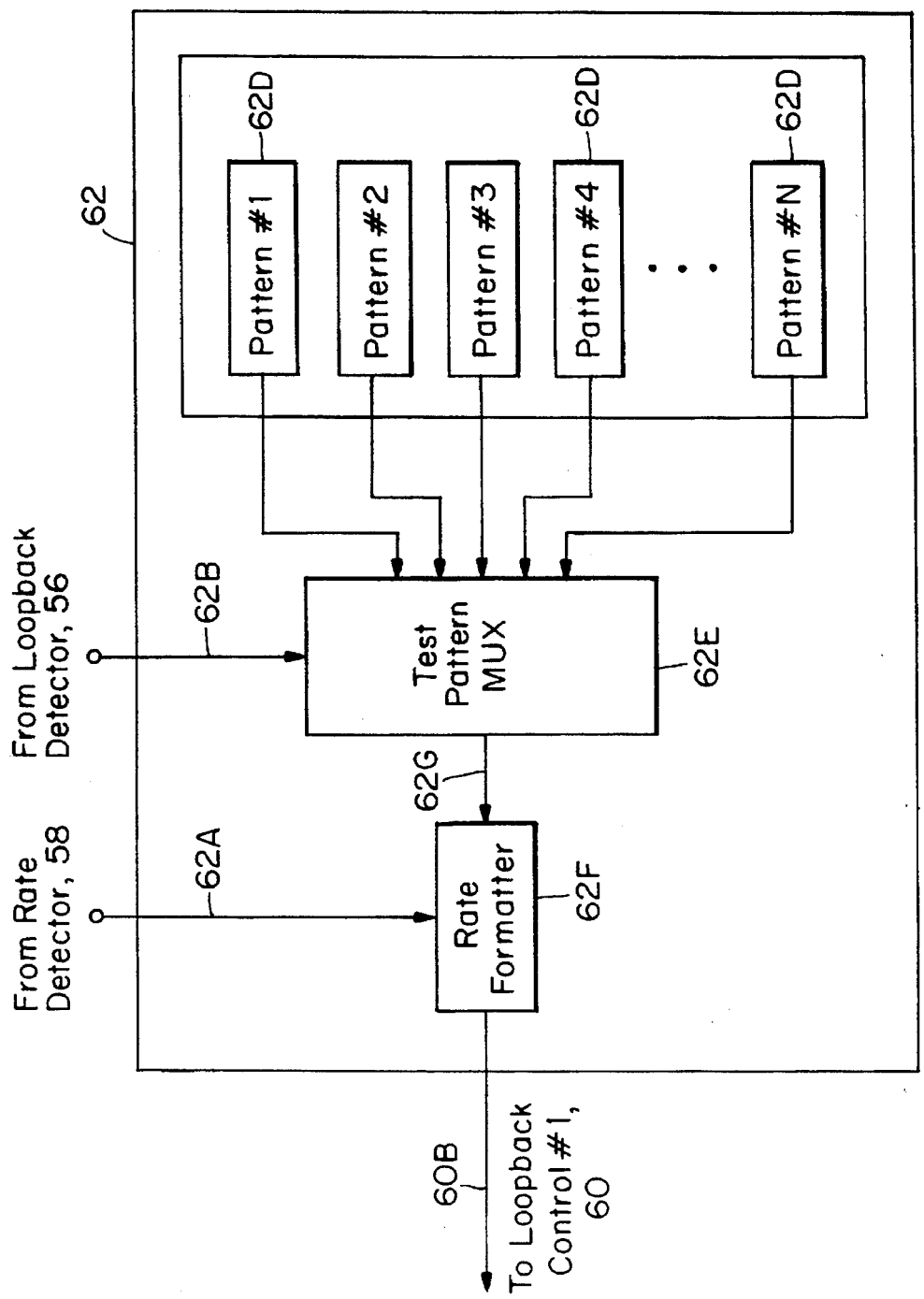
FIG. 4 is a detailed block diagram of the Network Interface Unit pattern generation circuit.

FIG. 4 is a block diagram illustrating the major components of the pattern generation circuit 62. Signal 62B is received from the loopback detector circuit 56 and is used to activate the pattern generator circuit 62 and to select which pattern to generate. The pattern generator circuit 62 is capable of generating a plurality of test patterns 62D. The test pattern multiplexer 62E uses signal 62B to select a particular pattern for transmission 62G. The rate formatter circuit 62F receives information over signal 62A from the rate detector circuit 58, and encodes the selected test pattern 62G in a format consistent with the rate of operation. The formatted test pattern is sent over line 60B through the first loopback control circuit 60 and on to the transmitter 66.

While this invention has been particularly shown and described with references to preferred embodiments thereof, it will be understood by those skilled in the art that various changes in form and details may be made therein without departing from the spirit and scope of the invention as defined by the appended claims.

We claim:

1. An apparatus for coupling to a local loop of a digital communication channel having first and second directions of transmission comprising:

a) a monitor circuit for monitoring said communication channel for a digital control command transmitted from a remote test system in said first direction of transmission; said control command comprising a generate-pattern command or a loopback-test command;

b) a loopback circuit for receiving digital test signals transmitted by said test system in said first direction of transmission and for returning said digital test signals to said test system in said second direction of transmission in response to said loopback-test command; and wherein the digital test signals that are returned are used by said test system to determine if communication errors occur in either said first or said second directions of transmission; and c) a pattern-generation circuit for generating a plurality of predetermined digital test data sequences which are transmitted to said test system over said communication channel in said second direction of transmission in response to said generate-pattern command; and wherein said test data sequences are used by said test system to determine if communication errors occur in said second direction of transmission.

2. The apparatus of claim 1 further comprising a rate detector circuit for determining transmission rate on said communication channel.

3. The apparatus of claim 1 further comprising an equalizer circuit for cleaning and boosting signals transmitted over said communication channel.

4. The apparatus of claim 1 further comprising a power circuit for deriving power from said communication channel and for supplying power to all circuits in said apparatus.

5. The apparatus of claim 1 wherein said test data sequences generated by said pattern-generation circuit include a repetitive pattern comprising a series of K bytes of identical bits followed by L bytes of identical bits opposite the previous series, a repetitive pattern comprising a series of M bytes of bits in a predetermined sequence followed by N bytes of identical bits, a continuous series of bytes of bits in a predetermined sequence, and a pseudo-random sequence, where K, L, M, N are all positive integers.

6. The apparatus of claim 5 wherein K equals at least 100, L equals at least 100, M equals at least 100, and N equals at least 100.

7. A method of testing a local loop of a digital communication system having a first direction and a second direction of transmission comprising the steps of:

a) generating a digital control command at a network test system for transmission in the first direction; said control command comprising a generate-pattern command or a loopback-test command;

b) receiving the control command at an interface unit;

c) responding to a loopback-test command at said interface unit by receiving digital test signals transmitted by said test system in said first direction of transmission and returning said digital test signals to said test system in said second direction of transmission; wherein said test system determines if communication errors occur in either the first or second directions of transmission; and responding to a generate-pattern command by generating a digital test data sequence at said interface unit and transmitting said test data sequence in said second direction to said network test system; said network test system determining if communication errors occur in the second direction of transmission.

8. The method of claim 7 further comprising the step of terminating the returning of digital test signals back to said network test system upon receipt at the interface unit of a control command comprising a plurality of transition in progress bytes.

9. The method of claim 7 further comprising the step of terminating said digital test data sequence generation in said second direction upon receipt at the interface unit of a control command comprising a plurality of transition in progress bytes.

10. The method of claim 7 wherein the step of receiving the control command includes receiving a generate-pattern command comprising a plurality of transition in progress bytes, a plurality of loopback select code bytes, a plurality of loopback enable bytes, iterations of a plurality of pattern identifier bytes and a plurality of loopback enable bytes, and a plurality of far end voice bytes, said pattern identifier bytes identifying the digital test data sequence to be generated.

11. The method of claim 7 wherein the step of generating a digital test data sequence includes generating a repetitive pattern comprising a series of K bytes of identical bits followed by L bytes of identical bits opposite the previous series, a repetitive pattern comprising a series of M bytes of bits in a predetermined sequence followed by N bytes of identical bits, a continuous series of bytes of bits in a predetermined sequence, and a pseudo-random sequence known as the 2047 sequence, where K, L, M, N are all positive integers.

12. The method of claim 11 wherein K equals at least 100, L equals at least 100, M equals at least 100 and N equals at least 100.

13. A method of isolating the direction of communication errors in a local loop of a digital communication channel comprising the steps of:

a) generating a digital control command comprising a loopback-test command or a generate-pattern command at a network test system;

b) communicating said control command to an interface unit coupled to the communication channel;

c) responding to a loopback-test command at the interface unit by receiving digital test signals transmitted by said test system and returning said digital test signals to said test system; said test system determining if communication errors occur on the communication channel in either direction of transmission between said test system and said interface unit; and d) responding to a generate-pattern command at the interface unit by generating a digital test data sequence and transmitting said test data sequence over said communication-channel to said network test system; said network test system determining if communication errors occur in a direction of transmission from said interface unit toward said test system.

14. A method of isolating the direction of communication errors in a local loop of a digital communication system comprising the steps of:

a) generating digital control commands and test data at a network test system for transmission in a first direction over a first two-wire pair; and b) responding to said control commands by generating a digital test data sequence and transmitting said test data sequence in a second direction over a second two-wire pair to said network test system for use by said network test system in determining if errors in communication occur in the second direction.

15. The method of claim 14 wherein the step of responding to a control command includes responding to a loopback command by returning test data received from said network test system in said first direction over said first two-wire pair back to said network test system in said second direction over said second two-wire pair, said network test system monitoring returned test data to determine if communication errors occur.

16. An apparatus comprising:

a) a monitor circuit for monitoring a local loop of a digital communication channel having first and second directions of transmission for a digital control command transmitted from a remote test system in said first direction of transmission; said control command comprising a generate-pattern command or a loopback-test command;

a loopback circuit for receiving digital test signals transmitted by said test system in said first direction of transmission and for returning said digital test signals to said test system in said second direction of transmission in response to said loopback-test command; said returned test signals being used by said test system to determine if communication errors occur in either said first or said second directions of transmission; and c) pattern-generation circuit for generating a plurality of predetermined digital test data sequences which are transmitted to said test system over said communication channel in said second direction of transmission in response to said generate-pattern command for use by said test system in determining if communication errors occur in said second direction of transmission.

17. A system comprising:

a) a digital communication channel for communicating data in first and second directions;

b) a network test unit coupled to said communication channel for sending a digital control command in said first direction and for receiving test data in said second direction; said control command comprising a loopback-test command or a generate-pattern command; and c) an interface unit coupled to said communication channel for receiving said control command, said interface unit responding to said loopback-test command by receiving digital test signals transmitted by said test system in said first direction and by returning said digital test signals to said test system in said second direction, said test system determining if transmission errors occurred in either said first or said second direction; said interface unit responding to said generate-pattern command by generating a digital test data sequence for transmission in said second direction, said network test unit receiving said test data sequence and determining if transmission errors occurred in said second direction.

18. The system of claim 17 wherein said generate-pattern command comprises a plurality of transition in progress bytes, a plurality of loopback select code bytes, a plurality of loopback enable bytes, iterations of a plurality of pattern identifier bytes and a plurality of loopback enable bytes, and a plurality of far end voice bytes, said pattern identifier bytes identifying the test data sequence to be generated by said interface unit.

19. The system of claim 17 wherein said control command further comprises a command for terminating the test data sequence comprising a plurality of transition in progress bytes.

20. The system of claim 17 wherein said control commands further comprises a command for terminating a loopback test comprising a plurality of transition in progress bytes.

21. The system of claim 17 wherein said test data sequences generated by said interface unit include a repetitive pattern comprising a series of K bytes of identical bits followed by L bytes of identical bits opposite the previous series, a repetitive pattern comprising a series of M bytes of bits in a predetermined sequence followed by N bytes of identical bits, a continuous series of bytes of bits in a predetermined sequence, and a pseudo-random sequence, where K, L, M, N are all positive integers.

22. The system of claim 21 wherein K equals at least 100, L equals at least 100, M equals at least 100 and N equals at least 100.

23. The system of claim 17 wherein said digital communication channel comprises a first and second pair of lines, said pairs of lines forming a local loop coupled to a communication channel.

24. A system comprising:
a) a network test system for generating a digital control command and digital test signals, and for inspecting digital test data sequences and said digital test signals to determine if transmission errors occur; said digital control command comprising a loopback-test command or a generate-pattern command;
b) a digital communication channel for communicating data in first and second directions;
c) a communication unit coupled to said digital communication channel for transmitting said control command and said digital test signals in said first direction, and for receiving said returned test data sequences and said digital test signals in said second direction; and
d) an interface unit coupled to said digital communication channel; said interface unit responding to said loopback-test command by receiving said digital test signal transmitted by said network test system through said communication unit in said first direction and by returning said digital test signals to said network test system through said communication unit in said second direction, said test system determining if transmission errors occurred in either said first or said second directions; said interface unit responding to said generate-pattern command by generating predetermined test data sequences and transmitting said test data sequences over said digital communication channel in said second direction, said test data sequences being received by said communication unit and inspected by said network test system, said network test system determining if transmission errors occurred in said second direction.

25. A system comprising:
a) a communication unit for transmitting digital information in a first direction over a first pair of lines and receiving digital information in a second direction over a second pair of lines, said pairs of lines forming a local loop coupled to a communication network;
b) an interface unit for interfacing with said local loop;
c) a network test system for generating digital control commands for transmission over said first pair of lines by said communication unit and for inspecting test data sequences received by said communication unit over said second pair of lines; and
d) a circuit for responding to said control commands on said first pair of lines by generating digital test data sequences and sending said test data sequences over said second pair of lines.

26. The system of claim 25 wherein said control commands include a loopback test command for initiating a loopback test, said interface unit responding to said loopback test command by entering into a loopback mode in which data received by said interface unit in said first direction is transmitted in said second direction.

27. The system of claim 26 wherein during a loopback test, said network test system sends loopback test data sequences to said interface unit in said first direction and receives said loopback test data sequences in said second direction after passage through said interface unit, said network test system determining if transmission errors occurred in either of said directions to transmission.

28. A system comprising:
a) a digital communication channel for communicating data in first and second directions;
b) a network test unit coupled to said communication channel for sending a digital control command and digital test signals in said first direction and for receiving digital test data sequences and digital test signals in said second direction, said control command comprising a loopback-test command or a generate-pattern command; and
c) an interface unit coupled to said communication channel comprising a command-detector circuit, a loopback circuit, and a pattern-generator circuit; said command detector circuit responding to a loopback test command by activating said loopback circuit, said loopback circuit receiving said digital test signals transmitted by said test unit in said first direction and returning digital test signals to said test unit in said second direction, said returned test signals used by said test unit to determine if communication errors occur in either said first or said second direction; said command-detector circuit responding to said generate-pattern command by activating said pattern-generator circuit, said pattern-generator circuit generating a digital test data sequence for transmission in said second direction, said network test unit receiving said test data sequence and determining if transmission errors occurred in said second direction.

29. The system of claim 28 wherein said generate-pattern command comprises a plurality of transition in progress bytes, a plurality of loopback select code bytes, a plurality of loopback enable bytes, iterations of a plurality of pattern identifier bytes and a plurality of loopback enable bytes, and a plurality of far end voice bytes, said pattern identifier bytes identifying the test data sequence to be generated by said interface unit.

30. The system of claim 28 wherein said control command further comprises a command for terminating a loopback test comprising a plurality of transition in progress bytes.

\* \* \* \* \*